Patented Apr. 7, 1936

2,036,404

UNITED STATES PATENT OFFICE 2,036,404

HYPO-ALLERGIC MILK

William O. Frohring, Shaker Heights, Ohio, assignor to S. M. A. Corporation, Cleveland, Ohio, a corporation of Ohio No Drawing. Application January 14, 1933, Serial No. 651,850

3 Claims. (Cl. 99—60)

This invention relates to milk products, and particularly to a milk product for use in certain special cases of feeding. The present application is a continuation of my prior application for Superheated milk, filed July 7, 1930, Serial No. 466,359.

Experience in the feeding of both infants and adults has discovered certain special cases where the patient is extremely sensitive to proteins, that is to say, to either or both of the casein or albumin, or to the globulin, the result of milk feeding in such cases being the development in the patient of a sometimes pronounced degree of eczema. The milk is then said to have allergic properties in the sense that when it is taken by such individuals it produces a systemic reaction. Such individuals are said to be allergic to the milk, or the milk is said to have allergic properties with respect to them.

Feeding such individuals with foods from other sources may sustain life without development, due to lack of the proper amino acids necessary for growth, all of which are found in milk casein and lactalbumin. For proper growth it may be that the infant requires all of the amino acids present in the milk proteins notwithstanding the pronounced tendency to eczema and other equally undesirable results.

The present invention aims to provide a milk product suitable for use in these exceptional cases, and particularly a milk product which may be of any suitable or desired composition, such as whole milk, skim milk, cream or the like, and which may be preserved indefinitely and without deterioration in sealed cans or other containers, and in which the proteins are in such form as to be acceptable by the patient without detrimental effect, or, in other words, a milk product whose allergic properties have been so reduced as to cause no further systemic reaction.

A further object of the invention is to provide a method of manufacture which reduces caramelization to a minimum and at the same time secures either maximum reduction of the allergic properties, or at least a reduction by an amount which supplies a product useful in the special cases of feeding referred to.

Briefly described, the invention consists in subjecting the milk product to a special heat treatment which is satisfactory for the purpose from the standpoint of both temperature and time. Both temperature and time are variable and so long as the upper limit of the zone of treatment is not exceeded, as will appear more fully hereinafter, it is found that increased severity of the treatment, either in temperature or time, or both, tends to further decrease the allergic properties of the milk product, or, in other words, to make it more suitable for absorption by the individual without the production of a systemic reaction.

The treatment may be varied within reasonable limits, according to the desired degree of reduction of allergic properties. If the temperature is raised, the treatment need not be conducted for so long a time, and if the time of treatment is increased, the temperature need not be so high. In any event, the heat treatment is carried to a point or to a degree of severity beyond that ordinarily employed for sterilization, which is usually a temperature of approximately 242° F. for say 20 minutes, with a coming up time of 15 minutes. However, it is considerably more than is necessary to destroy spores and bacteria. The treatment is always severe enough to produce a decided cooked flavor, but is never so severe as to destroy the characteristics commonly ascribed to milk or a milk product. The treatment is always stopped, by a limit on the maximum temperature, or by curtailment of the time of treatment, short of a point where destructive or otherwise objectionable chemical change occurs in the protein. It need not be stopped short of a degree of severity which produces coagulation of protein, because my severe heat treatment, even if applied to a product which coagulates or is coagulated, or in a manner to produce coagulation, will nevertheless reduce the allergic properties of the milk product, and there are certain special cases in which it is desirable for a patient to take or use a coagulated product, particularly in the case of adults.

Accordingly, therefore, I submit the milk product to be treated to a treatment, the severity of which is in a zone, the boundaries of which are on the one side a treatment severe enough to destroy spores and bacteria, and on the other side a treatment which is not severe enough to produce destructive or other objectionable chemical change in the protein. Between these two limits various products may be produced from any one of whole milk, skim milk, cream, or any other milk product, with no more than differences of degree between like products submitted to treatments within said zone but differing in degree only.

In addition to the foregoing the zone of severity of the heat treatment is still further restricted by the desire to reduce to a minimum caramelization and the accompanying tendency to increase acidity. For example, I have found in practice that the allergic properties of a milk product are reduced in a material amount if the milk product is subjected to a temperature even as low as 212° F. for say eight hours, or to a temperature as high as say 260° F. for one-half hour. However, either an extremely high temperature or an extremely long time of treatment results in objectionable caramelization, and, of course, the long period of treatment is also undesirable from the standpoint of economy. As a result I have found that the best results are secured in an intermediate portion of the zone of treatment above referred to, say from about 235° F. for three hours to about 245° F. for one and one-half hours, and I have consistently secured excellent results at a temperature of 240° F. to 242° F. for about two hours. Within this limited intermediate zone caramelization, destructive change and objectionable taste are at a minimum, and the reduction in allergic properties is almost as great as with more severe treatment and in fact so great as to satisfy all reasonable requirements.

If coagulation is undesirable, a small proportion of a suitable anti-coagulant, such as carbonate or bicarbonate of soda, may be added, say one-tenth of one percent by weight, but this anti-coagulant is not necessary and may be omitted, and when used plays no part in the process other than preventing the formation of clots or curds which otherwise might form.

The product is strikingly different from anything heretofore known. It differs from certain prior art patents, such as Webb 1,646,671, October 25, 1927 and Fenlon 1,526,780, February 17, 1925, which, if they are carefully studied, will be found to describe no more than ordinary sterilizing conditions, as above mentioned. These patents are instances of a group which do not provide a heat treatment sufficiently severe to do anything more than sterilize the product, and with them there is no appreciable or important decrease in the allergic properties of the product.

Neither is the invention in any way analogous to that of the Parsons Patent 1,824,496, September 22, 1931, which involves a treatment which materially exceeds the upper limits of my method and in which the product is described as having the aroma of highly roasted beef, conclusive that the proteins have been so broken down as to probably produce one of the amines or an amine derivative, such as glutamic acid, which is known to be one of the constituents of milk proteins, and which notably has the property of tasting like beef. The Parsons' product involves destructive chemical change and is no longer milk and cannot be regarded as a milk product or be substituted therefor.

My treatment is preferably carried out while the material is shielded against contact with the air. Usually the milk product is first pasteurized, then homogenized at a suitable pressure which may vary from 500 to 3000 pounds, after which the product is cooled, filled into containers, sealed, and then subjected, while sealed in said containers, to the proper heat treatment within the range or zone specified above, to produce the desirable reduction in allergic properties. However, the milk product may first be subjected to my severe heat treatment to any degree, as in a retort, then cooled, filled into cans, which are sealed and sterilized in the usual manner, or, my improved milk, in liquid form, may be concentrated by evaporation to dry powder, either in a vacuum pan or in a spray drier. In any event, if preserved, it should be preserved in the customary manner to avoid re-entry of spores or bacteria after removal of the same. A suitable way of subjecting the milk product to heat treatment without the access of air, is to enclose it in an atmosphere of steam or to perform the heat treatment while the product is under a vacuum.

The product has a light chocolate color and is pleasant, appetizing and agreeable to take, especially when sweetened with sugar. It is not hydrolyzed, or, in any event, has not been subjected to a destructive or otherwise objectionable chemical change. There may be some slight chemical alteration or rearrangement within the protein molecule, because experience shows that the anaphylactic properties have been changed, but this occurs without destructive or deleterious effect and does not interfere with proper absorption of the milk product by the patient to whom it is otherwise allergic.

My new milk product also shows other valuable and unexpected properties. For example, it may be acidified with lactic or other acid, as is commonly practiced in the acidification of milk for infant feeding, but without producing the usual clots or casein, the production of which sometimes makes acid milks difficult to feed to infants because the clots tend to clog the nipple of the feeding bottle. For this reason the addition of acid to milk intended for infant feeding usually must be carried out with great caution, requiring dilution of the concentrated acid, continuous and active stirring during addition of the acid, etc. My improved milk product, on the other hand, may be acidified to any degree without such precautions, as even concentrated lactic acid may be added directly without immediately stirring, and when the acid is ultimately stirred in a smooth, cream-like emulsion results which readily passes through the feeding bottle nipple.

My milk product may also be used as an emulsifying agent and as a substitute for egg yolk in the preparation of mayonnaise. It is valuable for this reason because many individuals cannot eat eggs without the production of a rash, similar to that described above in regard to milk allergic individuals. Such egg allergic individuals cannot eat ordinary mayonnaise prepared with egg yolk without suffering serious discomfort. Therefore, the discovery of a protein substitute for egg yolk suitable for use in the making of mayonnaise, and particularly one having nutritional properties similar to egg yolk, is a valuable addition to knowledge of nutrition. Oil emulsions have been made heretofore, similar to mayonnaise emulsions, using ordinary evaporated milk; but such emulsions usually break down with separation of the oil when vinegar or lemon juice is added to make the emulsion acid. With my allergic milk, however, no such breakdown or oil separation occurs and a stable and palatable product results, having excellent nutritional and keeping properties.

What I claim is:

1. A method of producing a milk product, consisting in subjecting the same to a heat treatment at a temperature of about 240° F. to 242° F. for a period of approximately two hours, thereby destroying spores and bacteria, but without producing destructive chemical change in the protein, and with reduction of caramelization to a minimum, and the product having reduced allergic properties with respect to individuals normally sensitive to the milk product.

2. A method of producing a milk product, consisting in subjecting the same to a heat treatment at a temperature between approximately 212° F. and 260° F. for a period of time varying proportionately with the temperature between approximately eight hours for the lower temperature and one half hour for the higher temperature, thereby destroying all spores and bacteria, but without producing destructive chemical change in the protein and in a manner to reduce caramelization to a minimum, and resulting in a product with reduced allergic properties with respect to individuals normally sensitive to the untreated milk product.

3. The process of producing a composition having the characteristics of a milk product, a light chocolate color and a decided cooked flavor and which is capable of being acidified with lactic or other acid to form a cream-like emulsion without forming the usual casein clots, said process comprising heating milk to a temperature between approximately 235° and 245° F. for a period of time varying proportionately with the temperature, the time of heating varying between three hours for the lower temperature and one and one-half hours for the higher temperature.

WILLIAM O. FROHRING.